3,464,961
ISOPRENE-STYRENE COPOLYMERS AND
METHOD OF MAKING SAME
Frederick C. Foster, Verona, N.J., assignor to The Firestone Tire & Rubber Company, Akron, Ohio, a corporation of Ohio
No Drawing. Continuation of application Ser. No. 229,971, Oct. 11, 1962, which is a continuation-in-part of application Ser. No. 544,353, Nov. 1, 1955. This application Apr. 13, 1966, Ser. No. 542,188
Int. Cl. C08d 3/04, 1/20, 1/32
U.S. Cl. 260—83.7     3 Claims

ABSTRACT OF THE DISCLOSURE

The disclosure generally describes a process for preparing rubbery copolymers of isoprene and styrene in which the isoprene portion of the molecules has a cis-1,4 structure of at least about 70% by weight. The process comprises copolymerizing isoprene and styrene monomers, preferably at 0° to 150° C. in the presence of metallic lithium, a hydrocarbon lithium compound, or a mixture of these in an amount such that there is present at the initiation of copolymerization about 0.00001 to about 1.0 part by weight of active catalyst expressed as lithium element per 100 parts by weight of monomer feed. It is essential that the polymerization system be maintained substantially free from foreign materials reactive with lithium and preferable that the isoprene in the feed have a purity of at least 95 mole percent.

DISCLOSURE

This application is a continuation of my copending application Ser. No. 229,971, filed Oct. 11, 1962, now abandoned, which is, in turn, a continuation-in-part of my application Ser. No. 544,353, filed Nov. 1, 1955, and now abandoned.

This invention relates to a new synthetic rubbery polymer having physical and chemical properties similar to those of Hevea rubber, and to a method for preparing such improved synthetic rubbery polymer.

It is well known that Hevea natural rubber is essentially a polyisoprene, containing small amounts of proteins and other substances derived from the rubber tree. Natural rubber is characteried by possessing excellent tack, especially after milling; producing vulcanizates having excellent resilience and low hysteresis properties, high tensile strength and good flexibility at low temperatures; and producing gum vulcanizates of high tensile strength; and displaying a crystalline structure when stretched. Heretofore all hydrocarbon synthetic rubbers, in comparison with natural rubber, have shown no crystalline properties, extremely low gum tensile strengths, relatively high hysteresis and low resilience. Although these synthetic rubbers have generally been superior to natural rubber in resisting crack initiation in service, they have been very much inferior in resisting cut growth.

It is an object of the invention to provide a synthetic rubber possessing the desirable properties of natural rubber, and especially low hysteresis and high gum tensile strength properties. Another object is to provide a synthetic rubber possessing the desirable good properties of natural rubber and also some of the unique good properties of synthetic rubbers. Another object is to provide a method of making the improved synthetic rubbers just mentioned. Other objects of the invention will become apparent as details of the invention are set forth.

During the latter part of the past century it was recognied that natural rubber is a polymer of isoprene, and various attempts were made to produce a true synthetic rubber by polymerizing isoprene. None of these attempts was successful, because the rubbery products obtained possessed properties much inferior to those of natural rubber. Furthermore the polymerization processes were extremely slow, and the rubbery products were mere laboratory curiosities. Butadiene and its homologs were polymerized to produce synthetic rubbers of various types during the early part of the present century, but no commercially acceptable synthetic rubber was produced until about 25 years ago, with the development in Germany of the Buna rubbers (from butadiene-1,3) and in this country of neoprene (from chlorobutadiene). Large scale commercialization of hydrocarbon synthetic rubbers during the past 20 years has been mostly in the field of emulsion polymerization, although this emulsion polymerization technique has never resulted in a hydrocarbon synthetic rubber approaching natural rubber in both gum tensile and hysteresis properties.

Considerable experimental work has been done in the field of alkali metal catalyzed polymerizations during the past 25 years. Except for a small amount of laboratory work, all of this activity has been concerned with the use of sodium metal as a catalyst. Both the Germans and the Russians have produced commercial sodium-catalyzed polybutadiene rubbers, but these have not been successful in competing on a commercial basis with emulsion polymers. Very little work is reported on the use of lithium metal as polymerization catalyst in this field, partly because lithium has not been readily available in the past, and also because polymerizations attempted in the presence of lithium as a catalyst have generally appeared to progress at a much slower rate than sodium-catalyzed polymerizations. This work apparently all involved either polymerization in the presence of ethyl ether as a solvent which is fatal to a high cis-1,4 structure or involved reaction of monomer in the presence of massive amounts of catalyst whereby the products were essentially all low molecular weight, being dimers, trimers, tetramers and the like.

It has now been discovered in accordance with the invention that a lithium-dependent catalyst is successfully employed for the copolymerization of isoprene and styrene to produce high molecular weight rubbery polymers approximating natural rubber in desirable properties, provided proper techniques also in accordance with the invention are employed. The preferred synthetic copolymers of the invention contain up to about 30 weight percent styrene. However, all copolymers of isoprene and styrene are within the contemplation of the invention and show new and interesting properties.

By "lithium-dependent catalyst," as used herein, is meant finely divided metallic lithium and/or organo-lithium compounds. "Organolithium compounds," as used herein, include the various lithium hydrocarbons. Suitable lithium hydrocarbons are for instance alkyl lithium compounds such as methyl lithium, ethyl lithium, butyl lithium, amyl lithium, hexyl lithium, 2-ethylhexyl lithium and n-hexyldecyl lithium. In addition to the saturated aliphatic lithium compounds, unsaturated compounds are also suitable such as allyl lithium, methallyl lithium and the like. Aryl, alkaryl and aralkyl lithium compounds such as phenyl lithium, the several tolyl and xylyl lithiums, alpha- and beta-naphthyl lithium and the like are also suitable. Mixtures of the various hydrocarbon lithium compounds are also suitable. For instance, catalyst can be prepared by reacting an initial hydrocarbon lithium compound successively with an alcohol and with an olefin such as isopropylene (i.e. a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aralkyl, aryl and alkaryl compounds such as 1,4-dilithium benzene, 1,5-dilithium naphthalene, 1-2-dilithium-1,3-triphenyl propane, the compound of the formula

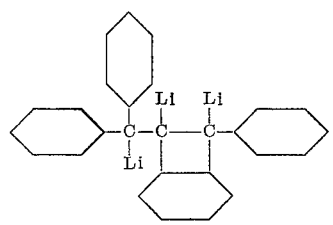

and the like. Tri- and higher lithium hydrocarbons are also suitable, such as 1,3,5-trilithium pentane or 1,3,5-trilithium benzene. Other organolithium compounds include the various lithium hydrocarbon amides. It should be understood that metallic lithium or the various organolithium compounds illustrated are suitable for producing the polymers of the invention either when utilized alone or when utilized conjointly.

As to the amount of catalyst, in general the larger the amount of catalyst used, the more rapidly the polymerization will proceed and the lower the molecular weight of the product. While any amount of lithium-dependent catalyst is effective to provide polymerization in accordance with the invention, in general, there will be employed an amount of catalyst such as to contain from about 0.00001 to about 1.0 gram of active lithium expressed as lithium element for each 100 grams of monomer in the polymerization mixture at polymerization initiation. In the case an organolithium catalyst is employed, catalyst concentration is desirably expressed in terms of carbon bound lithium as determined by the method of H. Gilman and A. H. Haubein, J. Am. Chem. Soc., 66, 1515–16 (1944). Preferably the smallest suitable amount of catalyst will be used, which ordinarily will not contain more than about 0.5 gram of active lithium expressed as lithium element per 100 grams of monomer. In the case of organolithium catalyst the amount of catalyst employed ordinarily will not exceed 0.01 gram carbon bound lithium per 100 grams monomer. The other alkali metals and organo-metal derivates of metals other than lithium produce polymers from isoprene and styrene entirely different from the polymers of the present invention.

The reaction may be carried out by mass polymerization techniques in which the isoprene and styrene, in substantially undiluted form, are contacted with the lithium-dependent catalyst, or by solution technique, in which the isoprene and styrene are dissolved in a suitable inert solvent and contacted with catalyst. The polymerization temperatures can vary over a wide range, for instance from 0° C. or lower, up to about 150° C. The isoprene and styrene are in liquid or vapor phase, depending on the temperature and pressure employed. Important factors influencing structure of the polymer and speed of the reaction are:

(1) Purity of monomer
(2) Purity of catalyst
(3) Concentration of moisture, air and oxygen
(4) Temperature of reaction.

Purity of monomer

Monomers of high purity are required to produce the polymers of the invention. This is particularly true in the case of the isoprene used. By isoprene of high purity is meant an isoprene of at least more than 90 mole percent purity and preferably in the neighborhood of 95 or more mole percent purity. In general, the purer the isoprene, the faster the reaction rate and the closer the structure and the properties of the resulting polymer to natural rubber. Acetylenic compounds, or other unsaturates such as olefins and non-conjugated diolefins should be kept at a minimum or removed prior to use, since they use up catalyst and also tend to lower the molecular weight of the resulting polymer. Any inhibitor normally present in a commercial isoprene must be removed by conventional technique prior to polymerization in accordance with the invention. Excellent polymers in accordance with the invention are produced from Pure Grade [1] or Research Grade [2] isoprene. The only purification required of these monomers prior to use is removal of inhibitor therefrom. Desirable polymers in accordance with the invention are also produced from a less pure grade of isoprene [3], which has a purity of about 91–93% and contains minor amounts of alkyl acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to 1.4216. In the examples below isoprene of the above standards of purity was used. No particular precautions need be taken by way of purifying commercial styrene other than simple distillation thereof.

Catalyst preparation

In case metallic lithium is to be the catalyst, the metal is melted, immersed in for example petroleum jelly, and the molten mass is subjected while maintaining same above the melting point of lithium, to high speed agitation under an inert atmosphere to produce finely divided metallic lithium dispersed in the petroleum jelly. The function of the petroleum jelly is to prevent air from contacting the lithium metal; any other medium which will perform this function is also suitable, such as other inert hydrocarbon solvents which boil above 200° C., e.g. mineral oil, paraffin and the like. It should be understood that high speed agitation is not the only means of providing metallic lithium in a finely divided state; any other means of producing lithium of relatively finely divided state is suitable. The preparation of the metallic lithium catalyst should be carried out in a closed container of non-reactive material, such as stainless steel or the like. Suitably, a high speed stirrer provides the agitation. Excellent results have been obtained with metallic lithium catalyst dispersions produced as above, wherein the particles of lithium had a mean diameter of about 20µ or a surface area of about one square meter per gram. Particle size of metallic lithium catalyst useful in practice of the invention suitably is such as to provide a surface area of 0.1 to 10 square meters per gram of catalyst.

Organolithium compounds, suitable as catalysts in practice of the invention, are produced in any desired manner. A convenient preparation of hydrocarbon lithiums involves reaction of metallic lithium with a hydrocarbon halide. Unlike the hydrocarbon-metal compounds of the alkali metals other than lithium, the catalytic action of the hydrocarbon lithium catalyst employed in this invention does

---

[1] Supplied by Phillips Petroleum Company, Bartlesville, Okla., and represented as having a purity of 99 mole percent and a refractive index at 20° C. of $n_D^{20}=1.422$.
[2] Supplied by Phillips Petroleum Company, and represented as having a purity of 99.6 mole percent and a refractive index at 20° C. of $n_D^{20}=1.422$.
[3] Supplied by Enjay Company, Inc.

not appear to be affected by the presence of other alkali metal salt compounds. For instance, in the synthesis of hydrocarbon alkali metal compounds, alkali metal halides are produced as by-products. Similarly, in the catalyst produced by the Alfin technique above referred to, alkali metal alkoxides are present. In the catalysis of polymerization with hydrocarbon-metal derivatives of metals other than lithium, these extraneous salts exert considerable, and in many cases essential effect. In the practice of the present invention, it does not appear that these extraneous salts have any effect whatsoever, they may be left in the hydrocarbon lithium catalyst, or allowed to settle out, without noticeably changing the action of the catalyst. In the event that one desires to use a hydrocarbon lithium amide as a catalyst, one can easily produce such a compound by reacting a hydrocarbon lithium with a secondary amine to produce the corresponding amide.

Concentration of moisture, oxygen and air

Moisture in the polymerization zone, since it tends to use up catalyst, should be kept at a minimum. Oxygen, nitrogen and other components of air have been found to inhibit polymerization and consequently should substantially be kept out of the reaction zone. These gaseous materials are conveniently removed by bringing the polymerization charge to a boil and venting a portion (e.g. about 10%) of the charge from the polymerization vessel prior to sealing the same and effecting polymerization. Particularly to be avoided is the presence of oxygen and oxygenated and nitrogenous compounds reactive with lithium such as ethers, esters, carbon dioxide, amines or the like, which are often considered essential components of alkali metal catalyst systems; these compounds should be substantially excluded from the reaction mixtures of this invention since their presence results in polymers having structures and properties essentially approaching those of the prior art polymers produced by sodium catalysis. By substantial exclusion or absence is meant less than 0.001 mole and preferably less than 0.0001 mole of such lithium reactive materials per 100 grams of isoprene.

Temperature

It has been found that the molecular weight and the proportion of cis-1,4-structure of the polymers in accordance with the invention tend to increase as the temperature of polymerization is decreased. Additionally, the reaction is difficult to control at elevated temperatures, particularly where isoprene of high purity is employed. Consequently, within the previously related temperature range it is desirable to operate at as low a temperature as practical.

Microstructure of products produced in accordance with the invention

It is understood that Hevea rubber (as well as Balata) molecules possess essentially a 1,4-structure, which means that the isoprene units of the molecules are connected to each other as a result of 1,4-addition to produce a linear chain. Each isoprene unit in a molecular chain contains a

group in the center portion thereof. As a result of the substituents connected to the carbon-carbon double bond, both cis and trans isomers are possible. It has been understood for some time that the Hevea rubber molecules are essentially cis in structure, whereas the Balata molecules are essentially trans. As is well known, Hevea rubber is very "rubbery," whereas Balata is quite resinous in its properties.

Recent infra-red studies have shown Hevea rubber to consist of about 97.8% cis-1,4-structure and about 2.2% 3,4-structure; Balata consists of about 98.7% trans-1,4-structure and about 1.3% 3,4-structure. Typical of GR–S emulsion polymers is the structure of 64% trans-1,4-, 18% cis-1,4- and 18% 1,2-. Rubbery emulsion polyisoprenes generally contain 65% or more trans-1,4-structure.

The isoprene portion of the isoprene-styrene copolymers produced in accordance with this invention is of essentially cis-1,4-structure. The exact structure of the polymers depends considerably upon the purity of the monomers, the styrene loading and the polymerization techniques employed. The isoprene portions of these copolymers show by infra-red technique at least about 70% cis-1,4-structure.

The proportions of the cis-1,4-, trans-1,4-, 1,2-, 3,4-additions and styrene in the polymers produced in accordance with the invention are best determined by means of infra-red analysis. The relative amounts of the five structures named are found by measuring the intensities of the infra-red absorption bands at 8.85, 8.68, 10.98, 11.25 and 14.29 microns for the five types of structures, in the order given above, and inserting these values into the equation:

$$D^i = e_1^i C_1 + e_2^i C_2 + e_3^i C_3 + e_4^i C_4 + e_5^i C_5$$

where:

$D_i$=absorbance (optical density) of the polymer at wavelength $i$ $e^i_{1,2,3,4, \text{ or } 5}$=the absorptivities of the several structures at wavelength $i$, the subscripts 1, 2, 3, 4, or 5 referring to the several component structures, and $C_{1,2,3,4 \text{ or } 5}$=the concentrations of the several structures, the subscripts 1, 2, 3, 4 or 5 referring to the several component structures.

The five equations obtained in this way are solved for $C_1$, $C_2$, $C_3$, $C_4$ and $C_5$, the values of the concentrations of the cis-1,4-, trans-1,4-, 1,2-addition, 3,4-addition and styrene components of the polymer.

The peak wavelengths selected, and the values of the absorptivities $e^i$ for these wavelengths for the several structures, are tabulated herewith:

| Structure | Molar absorptivities $e^i$ at wavelength of— | | | | |
|---|---|---|---|---|---|
| | 8.68 microns | 8.85 microns | 10.98 microns | 11.25 microns | 14.29 microns |
| 1,2-addition | 3.531 | 3.531 | 149.000 | 10.199 | 1.731 |
| 3,4-addition | 1.541 | 1.815 | 7.363 | 145.000 | 1.581 |
| Cis-1,4-addition | 3.583 | 6.518 | 1.860 | 1.530 | 0.572 |
| Trans-1,4-addition | 5.927 | 1.934 | 2.277 | 1.885 | 0.567 |
| Styrene | 6.080 | 1.540 | 9.200 | 2.625 | 154.000 |

Percentage values for the various types of addition products and styrene, based on the total polymer, are derived by dividing the absolute concentration of each type of component by the sum of the concentrations of the five types of components (1,2-; 3,4-; cis-; trans- and styrene) determined and multiplying by 100%, so that the sum of the percentages given will always be 100%. In order to assess the accuracy of the determination, total unsaturation is found; this is the quotient of the sum of the concentrations of the various components found by infra-red analysis, divided by the concentration of the solution used in the analysis, which is found by determining the total solids. In the detailed examples given hereafter, percent styrene is reported as derived above (based on total polymer). In the following examples, percentage of the other components (which actually are components of the isoprene portion of the polymer) of the polymer, however, are reported in each instance as percent of the isoprene portion of the polymer. The isoprene portion of the polymer constitutes the value obtained by subtracting the percent styrene (based on total polymer) from 100. The percent of each of the other components (based on only the isoprene portion of the polymer) is consequently obtained in each instance by dividing the percent of the component (based on the total polymer) by the number obtained by subtracting the percent styrene (based on the total polymer) from 100 and multiplying the quotient thus obtained by 100.

X-ray diffraction evidence of crystallinity

X-ray diffraction patterns of extended copolymers of the invention which contain up to about 30 percent styrene are typical of crystalline polymers. As the styrene content of the polymers of the invention approaches 30 percent, the crystallinity becomes weak; up to about 10 percent styrene, the polymers of the invention show relatively strong crystalline X-ray patterns.

Macrostructure of the polymers of the invention

Polymers of the invention have been produced with average molecular weights and weight distributions approximating natural rubber. Many of these polymers produced in accordance with the invention have average inherent viscosities typical for, or even greater than the value of commercial natural rubber of a good grade. The inherent viscosity figures hereafter are obtained by the procedure of G. D. Sands and B. L. Johnson, Industrial and Engineering Chemistry, vol. 19, page 261 (1947).

Polymerization and polymer recovery operations

For small scale laboratory operations, the polymerization reactions are conveniently carried out in glass bottles sealed by crown caps lined with aluminum foil or other flexible inert sheet material. Before use, the bottles should be dried, for instance by flaming and flushing with helium, argon or other inert gas. It is often desirable, even though the monomers and solvent (if used) have been previously purified, to subject these materials to a last purification before charging, as for instance by passing through a silica gel adsorption column during the charging. Preferred inert solvents are aliphatic, cycloaliphatic and aromatic hydrocarbon solvents such as pentane, hexane, heptane, petroleum ether, benzene, toluene, xylene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the monomers to evaporate with the bottle loosely capped. The catalyst is added by any suitable means. The sealed bottle may either be placed on a polymerizer wheel, arranged to dip and revolve the bottle in a water bath at the desired polymerization temperature; or, after brief shaking or other agitation to mix the catalyst and other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is susceptible to oxidation. A preferred method of shielding the polymer from oxidation consists of dipping it into a methanol, isopropanol or other alcoholic solution of an antioxidant and agitating the mixture. Any of the antioxidants conventionally employed with natural rubber are suitable, illustrative examples including phenyl-beta-naphthylamine, styrenated phenols and cresols, the mono and disulfides of dialkylphenols, amino phenols, aldimines and the like. The alcohol serves as a vehicle for distributing the antioxidant and as an agent to destroy the catalyst. The separated polymer is then preferably washed with water on a wash mill, usually with addition of further stabilizing agents and dried.

Corresponding techniques should be used in large scale polymerizations according to this invention. Usually the reaction should be carried out in a closed autoclave provided with a heat-transfer jacket and with a rotary agitator. Avoidance of oxygen contamination is most easily secured by evacuating the vessel prior to charging the monomers and other polymerization ingredients and evaporating and venting a portion of the charge to sweep out any traces of oxygen present. As a precaution for the purity of monomer, a silica gel or other suitable adsorption column is preferably inserted in the charging line. The catalyst is conveniently, although not necessarily, charged last, conveniently from an auxiliary charging vessel pressured with an inert gas and communicating with the polymerization vessel through a valved conduit. It is desirable to provide a reflux condenser to assist in the regulation of the temperature. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass is milled with water on a wash mill to remove the alcohol, additional antioxidant being incorporated during this operation. The product is then dried for storage and use.

For illustrations of the practice of the invention, reference may be had to the examples set out hereafter.

EXAMPLE 1

The following materials (excluding the catalyst) were mixed together and passed through a column of silica gel into a reaction chamber:

| | Parts by weight |
|---|---|
| Styrene | 10.00 |
| Isoprene | 90.00 |
| Petroleum ether | 300.00 |
| Metallic lithium (as a 35% dispersion in white petrolatum) | 0.14 |

The lithium metal catalyst was then introduced into the reaction chamber. The reaction chamber was sealed; and the ingredients were polymerized at 60° C. The resulting polymer was recovered according to previously outlined techniques and gel content and inherent viscosity determinations were made on the polymer. The percent gel in the polymer was 2.3%; the inherent viscosity of the polymer was 9.06. The microstructure of the polymer was determined by infra-red technique described above and was as follows:

| Based on isoprene portion of the polymer: | Percent |
|---|---|
| Cis-1,4-addition | 92.8 |
| Trans 1,4-addition | 0.0 |
| 1,2-addition | 0.0 |
| 3,4-addition | 7.1 |
| Based on total polymer: Styrene | 2.7 |

The X-ray diffraction pattern of this polymer was of a crystalline nature.

EXAMPLE 2

The following recipe was polymerized at 50° C.:

| | Parts by weight |
|---|---|
| Isoprene | 61.5 |
| Styrene | 38.5 |
| Petroleum ether | 143.5 |
| Pentamethylene dilithium (expressed as elemental lithium) | 0.01 |

The gel content of the resulting polymer was 0.5%. The inherent viscosity of the resulting polymer was 5.15. By infra-red technique the analysis of the polymer was:

| Based on isoprene portion of the polymer: | Percent |
|---|---|
| Cis-1,4-addition | 74.7 |
| Trans-1,4-addition | 15.3 |
| 1,2-addition | 0.7 |
| 3,4-addition | 9.3 |
| Based on total polymer: Styrene | 35.5 |

EXAMPLE 3

The following recipe was polymerized at from 50° C. to 60° C.:

| | Parts by weight |
|---|---|
| Isoprene | 91.0 |
| Styrene | 9.0 |
| Petroleum ether | 300.0 |
| Lithium metal (as a 35% dispersion in petrolatum) | 2.0 |

Gel content and inherent viscosity determinations were not run on this polymer. The structure of the polymer by infra-red analysis was:

| Based on isoprene portion of the polymer: | Percent |
|---|---|
| Cis-1,4-addition | 89.9 |
| Trans-1,4-addition | 3.2 |
| 1,2-addition | 0.2 |
| 3,4-addition | 6.8 |
| Based on total polymer: Styrene | 7.7 |

EXAMPLE 4

The following recipe was polymerized at 50° C.:

| | Parts by weight |
|---|---|
| Isoprene | 70.0 |
| Styrene | 30.0 |
| Petroleum ether | 300.0 |
| Metallic lithium (as a 35% dispersion in petrolatum) | 0.2 |

The resulting polymer contained no gel and had an inherent viscosity of 4.92. The structure of the polymer by infra-red technique was:

| Based on isoprene portion of the polymer: | Percent |
|---|---|
| Cis-1,4-addition | 84.3 |
| Trans-1,4-addition | 5.9 |
| 1,2-addition | 0.0 |
| 3,4-addition | 9.8 |
| Based on total polymer: Styrene | 19.5 |

EXAMPLE 5

As a further illustration of the practice of the invention, the following materials were charged into a reaction chamber under procedure similar to that previously outlined:

| | Parts by weight |
|---|---|
| Isoprene | 65.0 |
| Styrene | 35.0 |
| Petroleum ether | 152.0 |
| Metallic lithium (as a 35% dispersion in petrolatum) | 0.2 |

The above ingredients were polymerized at 50° C. until polymerization was complete. The gel content of the resulting polymer was 2.5. The inherent viscosity of the resulting polymer was 4.07. The analysis by infra-red technique was as follows:

| Based on isoprene portion of the polymer: | Percent |
|---|---|
| Cis-1,4-addition | 81.8 |
| Trans-1,4-addition | 8.5 |
| 1,2-addition | 0.05 |
| 3,4-addition | 9.2 |
| Based on total polymer: Styrene | 29.2 |

A trace of crystallinity was evidenced by an X-ray diffraction.

EXAMPLE 6

The following materials were charged into a polymerization reactor according to the previously outlined procedure:

| | Parts by weight |
|---|---|
| Isoprene | 75.00 |
| Styrene | 25.00 |
| Petroleum ether | 170.00 |
| Pentamethylene dilithium (expressed a lithium) | 0.01 |

The above ingredients were polymerized at 50° C. The resulting polymer had a gel content of 0.2 and an inherent viscosity of 4.68. The microstructure of the polymer, determined by infra-red means, was as follows:

| Based on isoprene portion of the polymer: | Percent |
|---|---|
| Cis-1,4-addition | 81.6 |
| Trans-1,4-addition | 8.9 |
| 1,2-addition | 0.0 |
| 3,4-addition | 9.5 |
| Based on total polymer: Styrene | 24.1 |

EXAMPLE 7

The following materials were charged into a reaction chamber under the procedure generally outlined above:

| | Parts by weight |
|---|---|
| Isoprene | 77.0 |
| Styrene | 23.0 |
| Petroleum ether | 180.0 |
| Metallic lithium (as a 35% dispersion in petrolatum) | 0.2 |

The ingredients were polymerized at 50° C. until polymerization was complete. The gel content of the resulting polymer was 1.5%. The inherent viscosity of the resulting polymer was 9.8. The X-ray diffraction pattern of this polymer was of a crystalline nature.

EXAMPLE 8

As an illustration of practice of the invention involving mass polymerization, the following materials were charged into a reaction chamber:

| | Parts by weight |
|---|---|
| Isoprene | 85.00 |
| Styrene | 15.00 |
| Metallic lithium (as a 35% dispersion in petrolatum) | 0.50 |

The above ingredients were polymerized at 50° C. to produce a polymer in accordance with the invention.

EXAMPLE 9

As another illustration of the production of a polymer in accordance with the invention, the following ingredients were polymerized at 50° C.:

| | Parts by weight |
|---|---|
| Isoprene | 90.0 |
| Styrene | 10.0 |
| Petroleum ether | 300.0 |
| Metallic lithium (as a 35% dispersion in petrolatum) | 0.2 |

The resulting polymer had a gel content of 2.8 and an inherent viscosity of 7.3. The microstructure of the polymer, by infra-red technique, was as follows:

| Based on isoprene portion of the polymer: | Percent |
|---|---|
| Cis-1,4-addition | 78.9 |
| Trans-1,4-addition | 12.4 |
| 1,2-addition | 0.0 |
| 3,4-addition | 8.5 |
| Based on total polymer: Styrene | 8.7 |

The polymer was compounded in a gum stock (referred to hereafter as polymer A) according to the following formulation:

| | Parts by weight |
|---|---|
| Polymer | 100.00 |
| Zinc oxide | 5.00 |
| Stearic acid | 4.00 |
| Sulfur | 3.00 |
| Accelerator | 0.75 |
| Antioxidant | 1.60 |

For purpose of comparison, Hevea rubber was also compounded according to the same formulation. Physical tests were run on these two compounds and the results are set out in Table 1 as follows:

TABLE 1

|  | Gum stocks | |
| --- | --- | --- |
|  | Polymer A | Hevea |
| Cured at 260° F., 600% modulus (p.s.i.): | | |
| 40 minutes | | 425 |
| 45 minutes | 250 | 1,100 |
| 50 minutes | 400 | 1,600 |
| Tensile at break, p.s.i.: | | |
| 40 minutes | | 1,675 |
| 45 minutes | 2,275 | 3,150 |
| 50 minutes | 1,925 | 3,525 |
| Elongation, percent: | | |
| 40 minutes | | 780 |
| 45 minutes | 940 | 740 |
| 50 minutes | 840 | 720 |

Another portion of polymer A and another portion of the same Hevea rubber were compounded in a typical tread stock as follows:

| | Parts by weight |
| --- | --- |
| Polymer | 100.0 |
| Carbon black | 50.0 |
| Zinc oxide | 3.0 |
| Stearic acid | 2.6 |
| Softener | 3.0 |
| Sulfur | 2.6 |
| Accelerator | 0.5 |
| Antioxidant | 2.0 |

The physical properties of the above two compounds were determined and are reported in Table 2 which follows:

TABLE 2

|  | Tread stocks | |
| --- | --- | --- |
|  | Polymer A | Hevea |
| Cured at 280° F., 300% modulus (p.s.i.): | | |
| 30 minutes | 950 | 1,300 |
| 45 minutes | 1,725 | 1,650 |
| 60 minutes | 1,950 | 1,875 |
| 90 minutes | 1,825 | 1,825 |
| Tensile at break, p.s.i.: | | |
| 30 minutes | 3,175 | 3,275 |
| 45 minutes | 2,925 | 3,625 |
| 60 minutes | 2,800 | 3,900 |
| 90 minutes | 2,600 | 3,825 |
| Elongation, percent: | | |
| 30 minutes | 730 | 560 |
| 45 minutes | 500 | 540 |
| 60 minutes | 420 | 540 |
| 90 minutes | 510 | 530 |
| Cured 60 minutes at 280° F., forced vibrator at 100° C.: | | |
| Dynamic modulus, p.s.i. | 207 | 177 |
| Static modulus, p.s.i. | 177 | 139 |
| Internal friction, kilopoises | 2.7 | 2.8 |

The novel polymers of the invention, as previously pointed out, possess properties and characteristics heretofore not obtained in any single synthetic polymer. The polymers of the invention, and particularly those containing at least about 60% isoprene are essentially cis-1,4-addition polymers, the isoprene portion thereof constituting about 70% or more cis-1,4-addition product. Many of the polymers of the invention have molecular weights of the order, or greater than, the molecular weights of Hevea rubber. Many of the polymers of the invention contain very little gel. Many of the polymers, and particularly those containing no more than about 30% styrene, exhibit when extended a fiber crystalline X-ray diagram similar to extended Hevea. The polymers of the invention when vulcanized in either a gum stock or a reinforced stock, give tensiles comparable to Hevea rubber. Vulcanized reinforced stocks containing the polymers of the invention exhibit low hysteresis and high modulus comparable to natural rubber, higher modulus than synthetic rubbers of the prior art, excellent resistance to wear and excellent resistance to flex cracking.

What I claim is:

1. Method of producing rubbery synthetic copolymers of isoprene and styrene wherein the isoprene portion of the molecule has a cis-1,4 structure of at least about 70% by weight, which method comprises copolymerizing a mixture of monomeric isoprene and monomeric styrene in the presence of a hydrocarbon lithium compound catalyst, said catalyst being employed in an amount sufficient to contain at initiation of copolymerization from about 0.00001 to about 1.0 part by weight of active catalyst expressed as lithium element per 100 parts by weight of said mixture, and the polymerization system being maintained substantially free from foreign materials reactive with lithium.

2. Method according to claim 1 wherein the isoprene has a purity of at least about 95 mole percent.

3. Method according to claim 1 wherein the polymerization is conducted at a temperature of from about 0° C. to about 150° C.

References Cited

UNITED STATES PATENTS

| 3,317,918 | 5/1967 | Foster | 260—83.7 |
| 3,329,666 | 7/1967 | Stearns | 260—94.2 |
| 3,335,122 | 8/1967 | Trepka | 260—94.2 |
| 2,506,857 | 5/1950 | Crouch | 260—83.7 |
| 2,979,494 | 4/1961 | Stearns | 260—94.2 |

JOSEPH L. SCHOFER, Primary Examiner

J. C. HAIGHT, Assistant Examiner

U.S. Cl. X.R.

260—82.1, 94.2